Sept. 21, 1926.  
T. F. EMANS  
WEIGHING SCALES  
Filed Nov. 26, 1924  
1,600,539
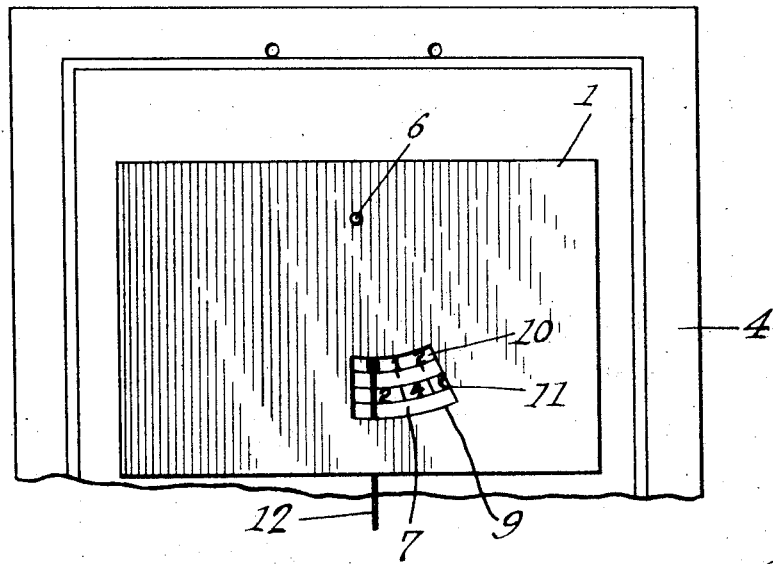
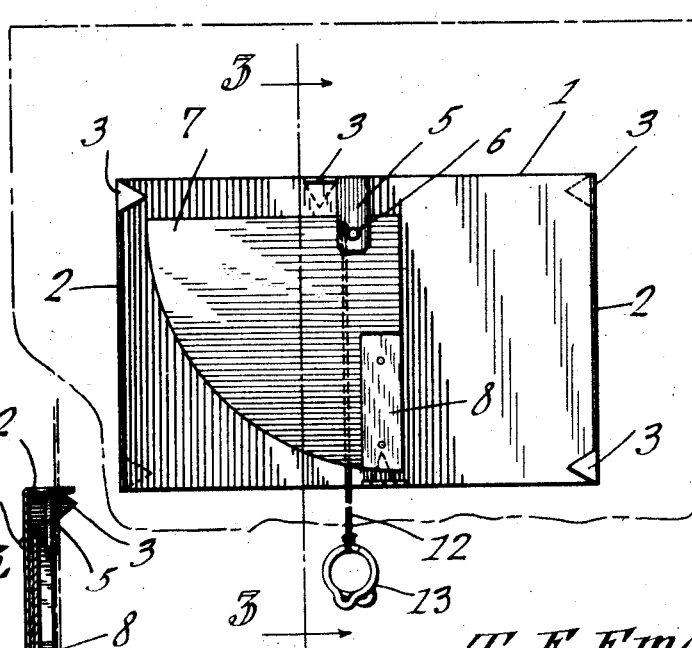
Inventor  
T. F. Emans  
By 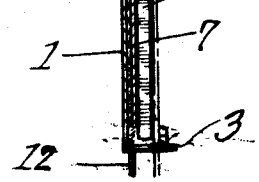  
Attorney Patented Sept. 21, 1926.

1,600,539

UNITED STATES PATENT OFFICE.

THEODORE F. EMANS, OF CHICAGO, ILLINOIS.

WEIGHING SCALES.

Application filed November 26, 1924. Serial No. 752,417.

This invention relates to weighing scales and it is more especially a device for use in weighing mail such as letters and small packages, the weighing mechanism being of such a small nature that it can be combined with calendars or other like devices used for display or advertising purposes, the incorporation of the scales with the calendar or the like greatly adding to its utility and insuring frequent use thereof and, consequently, increasing its value as an advertising medium.

Another object is to provide weighing scales which are simple, compact and efficient, and can be made at relatively low cost.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a front elevation of a portion of a calendar or the like having the present improvements combined therewith.

Fig. 2 is a rear elevation of the weighing attachment, a portion of the card to which it is attached being outlined by broken lines.

Fig. 3 is a section on line 3—3, Fig. 2.

Fig. 4 is an enlarged elevation of one corner portion of the movable segment.

Referring to the figures by characters of reference 1 designates the face plate of the weighing attachment, this plate being made of a thin sheet of metal such as tin, aluminum or the like, although, it is to be understood that, if preferred, it can be made of paper board or other suitable stiff material. In the structure shown the plate is provided with side flanges 2 and with prongs 3. The prongs are adapted to be extended through a card 4 constituting the body portion of the calendar, display card or the like and by bending these prongs back against the card 4, the flanges 2 can be held firmly in position against said card.

A tongue 5 is extended from one edge of the plate 1 and is spaced from the front portion of the plate. This tongue, as well as the plate 1, is adapted to receive and support a pivot pin 6 on which is mounted one corner portion of a segmental dial 7 which can be formed of cardboard, metal or any other desired material having the requisite stiffness. This dial is provided along one edge with a weight 8 which can be in the form of a piece of metal riveted or otherwise attached. The dial is visible through an opening 9 formed in the plate 1 and on the visible face of the dial are arranged concentric series of graduations indicated at 10 and 11 respectively, one set of graduations 10, indicating weight in ounces or other units of measure while the other set of graduations 11, indicates the amount of postage required for the indicated weight. A cord 12 is attached to the segmental dial 7 close to the pin 6 and is extended downwardly between the dial and the plate 1 so as to be exposed back of the opening 9. This cord may be provided at its free end with a clip 13 for engaging a letter or other article to be weighed.

When the card 4 is suspended vertically by any suitable means, the cord 12 will hang vertically and will register with the first or zero graduations of the two series 10 and 11 as shown in Fig. 1. When an article is to be weighed, it is attached to a clip 13 and the weight thereof will cause cord 12 to pull downwardly on the upper portion of the dial 7, thereby causing the weight 8 to shift from its normal position. That portion of the cord exposed in the opening 9 will serve as an index or pointer and when the dial is moved by the article suspended from the cord, the graduations designated by the cord will indicate the weight of the article and the amount of postage required.

It will be noted that with this device no adjustment is necessary. The parts are so proportioned that articles of different weights can be quickly and accurately weighed. The suspended cord constitutes the indicator or pointer and there are no parts likely to get out of order as a result of ordinary use. The mechanism is cheap to manufacture and can be applied readily to a calendar, advertising card or the like so as to render the same of greatly increased value as an advertising medium and as an article of utility.

The plate 1 with its flanges constitutes a means for spacing the movable parts of the scale away from the card 4 or the structure on which it is suspended so that the article being weighed can swing freely and will not rub upon the adjacent supporting surface and interfere with the proper weighing operation. If necessary the tongue 5 can be bent forwardly or backwardly relative to the plate 1 so as to maintain the segment 7 at a desired distance away from the card 4.

What is claimed is:—

The combination with a supporting engaging member of a plate, flanges extending from the plate for holding it spaced from the support engaging member, said flanges being connected to said member, a tongue integral with and supported back of the plate, a weighted segmental dial pivotally mounted between the plate and tongue, there being an opening in the plate and said dial having concentric series of graduations for display in the opening, a cord connected to the dial and suspended therefrom for attachment to an article to be weighed, said cord extending back of the opening and constituting an indicator for cooperating with the graduations, the cord being held spaced from the support engaging member by the dial and said dial being held spaced from the support engaging member by the tongue and flanges.

In testimony that I claim the foregoing as my own, I have hereto affixed my signature.

THEODORE F. EMANS.